Sept. 16, 1958     C. E. DEARDORFF     2,852,040
PLATE TYPE VALVE
Filed April 4, 1955
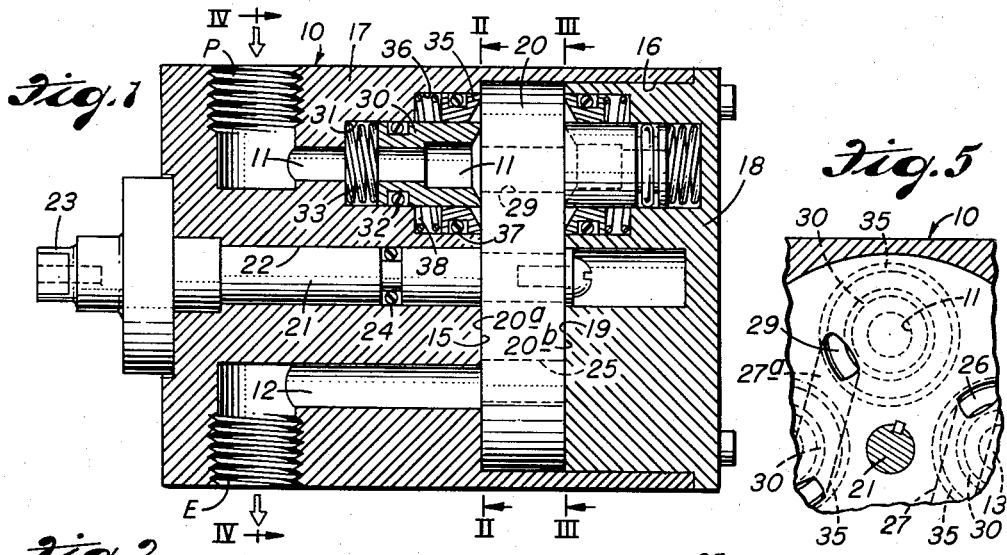
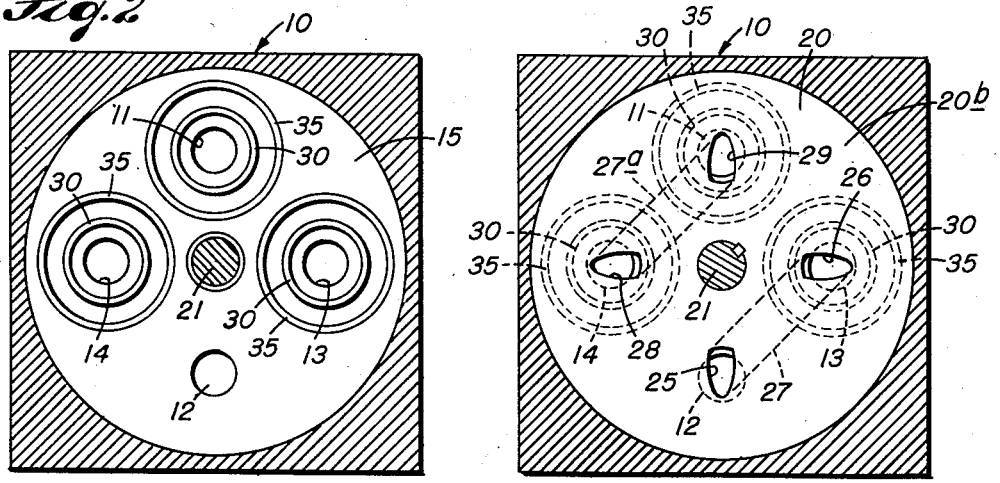
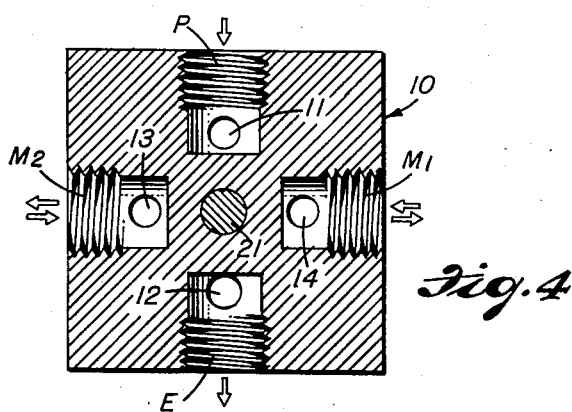
INVENTOR.
C. E. Deardorff
BY
ATTORNEY

United States Patent Office 2,852,040
Patented Sept. 16, 1958

2,852,040
PLATE TYPE VALVE

Clinton E. Deardorff, Reseda, Calif., assignor to Bendix Aviation Corporation, North Hollywood, Calif., a corporation of Delaware Application April 4, 1955, Serial No. 498,824

3 Claims. (Cl. 137—624)

This invention relates to valves of the type referred to as the plate type, in which two members having contacting faces are mounted for relative sliding movement between a position in which a port in one face registers with a port in the other face and a position in which the ports do not register. More specifically, the invention relates to a known type of plate valve in which a port in one member is defined by a sleeve slidable in that member and having a sealing fit at its front end with the face of the other member.

This latter type of valve has the advantage that it is easier to obtain a low friction seal between the end of a sleeve and a flat face than between two flat faces. However, it has the defect that during movement into and out of open position the annular sealing surface at the end of the sleeve laps the cooperating port in the other member, permitting interflow of pressure fluid between the faces of the members to other ports. To reduce such interflow to a permissible value, it has usually been necessary to lap the faces of the members, despite the use of sleeves.

An object of the invention is to provide a plate valve in which interflow is eliminated without accurately fitting the faces of the members.

A feature of the invention is a valve having two separate concentric sealing sleeves of such diameter relative to the cooperating port that during opening and closing movement the port is contained within the outer sleeve during its transit across the inner sleeve.

Another feature is a valve as described in which the port is especially shaped to have a large flow area and still be containable between the inner and outer sleeves.

Other more specific objects and features of the invention will appear from the description to follow with reference to the drawing, in which:

Fig. 1 is a longitudinal section taken thorugh the axis of a rotary plate type valve incorporating the invention.

Figs. 2, 3 and 4 are cross-sectional views taken in the planes II—II, III—III and IV—IV, respectively, of Fig. 1.

Fig. 5 is a detailed cross-section taken in the same plane as Fig. 3, but showing the valve members in a different relative position.

Referring to the drawing, the valve therein disclosed comprises a body 10 defining: a pressure fluid passage 11 communicating with an external pressure port P; an exhaust passage 12 communicating with an external exhaust port E; a first motor passage 13 communicating with an external motor port M2; and a second motor passage 14 communicating with an external motor port M1. The passages 11, 12, 13 and 14 all terminate in a flat face 15 constituting the inner end of a bore 16 in a body member 17. The outer end of this bore 16 is closed by a closure member 18 having a flat face 19 parallel to and spaced from the face 15, and defining with the cylindrical inner portion of the bore 16 a chamber containing a cylindrical plate member 20 which is rotatable with respect to the body 10 and can be rotated by means of a shaft 21 extending through an axial bore 22 in the body member 17 and having a head 23 adapted to be engaged by a wrench or handle. The chamber containing the plate 20 is completely sealed from the exterior of the body as by an O-ring seal 24 between the shaft 21 and the bore 22.

The plate 20 has a pair of passages 25 and 26 extending therethrough parallel to the axis of rotation and interconnected by a cross passage 27, and a second set of passages 28 and 29 extending through the plate and interconnected by a cross passage 27a within the plate. In one position of the valve, as shown in Figs. 1 and 3, the passages 29 and 28 are in registration with the passages 11 and 14 in the body member 17, and the plate passages 25 and 26 are in registration with the body member passages 12 and 13. This connects the pressure port P to the motor port M1 and connects the motor port M2 to the exhaust port E. By rotating the plate 20 90° in either direction from the position shown in the drawings, the connections will be reversed; that is, the motor port M1 will be connected to the exhaust port 12, and the motor port M2 will be connected to the pressure port P. By rotating the plate half-way between the two open positions, all of the plate passages 11, 12, 13 and 14 are disconnected from the passages 11, 12, 13 and 14 in the body. This is typical four-way valve action.

The plate 20 is fitted between the faces 15 and 19 of the body for free turning movement, which would not provide a satisfactory fluid seal between the plate and body surfaces. However, leakage is prevented by providing each of the body passages 11, 13 and 14 with concentric inner and outer sleeves, the ends of which seal with the face 20a of the plate 20. Thus, referring to Fig. 1, the inner sleeve 30 is slidable in a counterbore 31 in the body member 17 and sealed with respect thereto by an O-ring 32, and is urged toward the plate 20 by a helical spring 33 compressed between the outer end of sleeve 30 and the end wall of the counterbore 31. The outer sleeve 35 is slidably fitted in an outer counterbore 36 in the body member 17 and sealed with respect thereto by an O-ring 37. It is urged toward the plate 20 by a helical spring 38 compressed between the outer end of the sleeve 35 and the inner end of the counterbore 36. In accordance with well-known practice, the sleeves 30 and 35 are beveled at their outer ends to seal with the face 20a of the plate 20 over relatively narrow annular surfaces. When pressure exists within either sleeve, it acts both against the beveled front end thereof and the flat rear end thereof and produces a force urging the sleeve against the plate 20 that is proportional to the difference between these two areas. The pressure fluid present at the front end of the outer sleeve 35 reaches the rear end thereof through the unsealed clearance between the cooperating concentric surfaces of the two sleeves 30 and 35. The passages 13 and 14 have associated therewith counterbores and sleeves identical with those described for the passage 11. No counterbores or sleeves are provided in connection with the passage 12, since this is the exhaust passage and never contains fluid at any appreciable pressure. Any fluid leakage from the passages 11, 13 or 14 finds its way into the exhaust passage 12.

In order to provide a hydraulically balanced structure, the passages 25, 26, 28 and 29 in the plate 20 may be extended therethrough from the one face 20a to the opposite face 20b, and blind counterbores provided in the closure member 18 containing inner and outer sleeves juxtaposed to and identical with those in the body member 17. This applies the pressure fluid existent in any one of the passages 25, 26, 28 or 29 to equal and opposite areas of the faces 20a and 20b, respectively, to cancel any thrust tending to bind the plate against either the body face 15 or the body face 19.

When the valve is in an open position, as shown in Figs. 1 and 3, in which the plate passages are aligned with the body passages, each of the inner sleeves 30 forms an annular seal with the plate 20 around the associated plate passage and prevents interflow between the various body passages 11, 12, 13 and 14 through the clearance between the plate and body faces.

However, as the plate 20 is rotated 45° from open position into closed position, the plate passages move across the inner sleeves into positions between the inner and outer sleeves, as shown in Fig. 5, and then across the outer sleeves into positions overlapping adjacent outer sleeves.

While the plate passages are moving across the inner sleeves, the latter are ineffective to prevent interflow leakage between the different body passages, but the outer sleeves are effective to prevent such leakage.

When the plate passages have cleared the inner sleeves, as shown in Fig. 5, all the body passages 11, 13 and 14 that may contain high pressure fluid are closed by sealing contact of their associated inner sleeves 30 with imperforate portions of the plate face 20a, and interflow leakage between different body passages is thereby prevented. It is immaterial that the plate passages may not be sealed from each other at this time by the outer sleeves 35, since they are all sealed from the high pressure body passages by the inner sleeves 30.

In order to minimize the differential radius between the inner sleeves 30 and the outer sleeves 35 without unduly reducing the flow areas of the plate passages 25, 26, 28 and 29, the latter may be of wedge shape with convex sides having the same circular curvature as the outer sleeves, as clearly shown in Fig. 5. For use with inner and outer sleeves of given diameters, plate passages so shaped have substantially larger areas than would circular passages of diameter small enough to lie between the inner and outer sleeves during valve movement.

Although for the purpose of explaining the invention, a particular embodiment thereof has been shown and described, obvious modifications will occur to a person skilled in the art, and I do not desire to be limited to the exact details shown and described.

I claim:

1. A valve comprising: a pair of relatively movable members having contacting faces and means for moving one of said members to produce shearing movement between said faces; each of said members having a fluid passage opening through its respective face in juxtaposed relation to the other in one relative position of said members; one of said members having in its said face inner and outer counterbores of different diameters and concentric with respect to each other; an inner sleeve in sliding sealing relation with said inner counterbore and defining the end portion of the passage in the one member terminating at said face; an outer sleeve movable independently of said inner sleeve in sliding sealing relation with said outer counterbore; each of said sleeves having an outer end fitting against said face of the other member in sliding sealing relation, and means urging said sleeves against said face; the passage in said other member in the said surface thereof being of shape and size to be contained within said inner sleeve when said members are in said one relative position and between said inner and said outer sleeves in another relative position.

2. A valve according to claim 1 in which said members are relatively rotatable about an axis spaced beyond said outer sleeve, and said passage through the surface of said other member is wedge-shaped, with its base toward said axis.

3. A valve according to claim 1 in which said one member comprises a second face juxtaposed to said mentioned face and defining therewith a chamber containing said second member, said second member having a second face parallel to its said mentioned face and in which said passages extend through said second member from one face to the other, said body including a second set of counterbores and inner and outer sleeves identical with said first-mentioned counterbores and sleeves, and juxtaposed thereto in said second face of said one member, whereby the inner and outer sleeves on opposite sides of said second member define therewith pressure areas of identical opposed areas.

References Cited in the file of this patent

UNITED STATES PATENTS

| 2,384,318 | Le Bleu | Sept. 4, 1945 |
| 2,688,981 | Greer | Sept. 14, 1954 |
| 2,698,731 | Koehler | Jan. 4, 1955 |

FOREIGN PATENTS

| 268,631 | Switzerland | 1950 |
| 1,075,683 | France | 1954 |